United States Patent [19]
Kauffman et al.

[11] Patent Number: 5,532,306
[45] Date of Patent: Jul. 2, 1996

[54] WATER-SENSITIVE RUBBER-BASED HOT MELT ADHESIVES

[75] Inventors: Thomas F. Kauffman, Easton, Pa.; Matthew L. Sharak, Franklin Park; Robert C. Schmidt, Jr., Green Meadows, both of N.J.

[73] Assignee: National Starch and Chemical Investment Holding Corporation, Wilmington, Del.

[21] Appl. No.: 298,736

[22] Filed: Aug. 31, 1994

[51] Int. Cl.⁶ ............................ C08J 5/10; C08L 53/00; C08K 5/06
[52] U.S. Cl. .................... 524/274; 524/272; 524/310; 524/366; 524/376; 524/377
[58] Field of Search ........................ 524/272, 274, 524/366, 376, 377, 310

[56] References Cited

U.S. PATENT DOCUMENTS

| | | | |
|---|---|---|---|
| 4,548,845 | 10/1985 | Parsons et al. | 524/274 |
| 4,623,688 | 11/1986 | Flanagan | 524/377 |
| 5,143,961 | 9/1992 | Scholl et al. | 524/221 |
| 5,182,323 | 1/1993 | Russell | 524/322 |
| 5,322,876 | 6/1994 | Sasaki et al. | 524/366 |
| 5,356,963 | 10/1994 | Kauffman et al. | 524/43 |

FOREIGN PATENT DOCUMENTS

| | | |
|---|---|---|
| 01994A2 | 10/1986 | European Pat. Off. . |
| 298319A1 | 1/1989 | European Pat. Off. . |
| WO9221718A | 10/1992 | WIPO . |

*Primary Examiner*—Paul R. Michl
*Assistant Examiner*—Olga Asinovsky
*Attorney, Agent, or Firm*—Ellen T. Dec

[57] ABSTRACT

A water sensitive hot melt adhesive composition comprising 5 to 80% by weight of a A-B-A linear or radial rubbery block copolymer, 10 to 50% by weight of a water soluble or water dispersible plasticizer; 0 to 85% by weight of a compatible tackifying resin; 0 to 35% by weight polar wax; and 0 to 3% by weight stabilizer.

8 Claims, No Drawings

WATER-SENSITIVE RUBBER-BASED HOT MELT ADHESIVES

BACKGROUND OF THE INVENTION

Hot melt adhesives are used commercially for a wide variety of applications. The major advantage of hot melt adhesive systems is the lack of a carrier fluid which eliminates the need for drying the adhesive film once it is applied to the substrate. This elimination of the drying step overcomes hazards associated with solvent usage and also allows for faster production line speeds and lower transportation costs. Depending on the desired use, the degree of tack of the hot melt adhesives may be varied over a wide range to produce adhesives varying from pressure sensitive to non-pressure sensitive in character.

Rubbery block polymers are often used for these constructions; however, these block polymers are not generally water soluble/sensitive. For various applications, it is also desired that some hot melt adhesives be hydrophilic, i.e., be water-sensitive or water-activated. Such hydrophilic adhesives find use, for example, in the construction of flushable disposable products including diapers and sanitary napkins where the high degree of tack which is needed during construction and use must be substantially decreased so as to prevent adhesion to porcelain and sewer pipes. Hydrophilic adhesives are also useful in certain applications where easy-clean up of the application equipment is desirable.

Various water dispersible pressure sensitive adhesives are known. Thus, U.S. Pat. No. 4,331,576 to Colon, et al., discloses hot melt pressure sensitive adhesives which contain vinyl pyrrolidone/vinyl acetate copolymers, ethylene/vinyl acetate copolymers, certain fatty acids and rosin or tall oils. U.S. Pat. No. 5,182,323 to Russell teaches the preparation of water soluble or water dispersible hot melt pressure sensitive adhesives from conventional thermoplastic rubbers which are compounded with copolymers of vinyl pyrrolidone and also with a monocarboxylic fatty acid. Further, EP 298,319 teaches the use of poly(ethyoxazoline) to provide water sensitivity.

The use of water soluble polymers such as polyvinyl pyrrolidone/vinyl acetate copolymers or poly(ethyloxazoline), while providing the desired water sensitivity, is disadvantageous in that the resultant adhesive suffers from poor thermal stability and low creep resistance.

SUMMARY OF THE INVENTION

We have now found that water sensitive hot melt adhesives may be prepared from specifically tackified A-B-A rubbery based block copolymer adhesives by the incorporation therein of a water soluble or water dispersible plasticizer.

Thus, the present invention is directed to water sensitive hot melt adhesive compositions comprising 5 to 80% by weight of an A-B-A linear or radial rubbery block copolymer; 0 to 85% of a compatible tackifier; 10 to 50% of a water soluble or dispersible plasticizer; 0 to 35% of a polar wax; and 0 to 3% by weight stabilizer.

The resultant adhesives are characterized by possessing high tack when needed yet have the ability to lose tack upon contact with water while, at the same time, possessing superior thermal stability and creep resistance. The adhesives are also characterized by superior adhesion to low energy surfaces such as polyethylene as well as possessing an excellent balance of strength and flexibility, the latter properties being especially desirable in bonding disposables such as diapers and sanitary napkins.

DETAILED DESCRIPTION OF THE PREFERRED EMBODIMENT

The rubbery (elastomeric) component of the compositions of the present invention are linear or radial block copolymers having the general configuration:

A-B-A wherein the polymer blocks A are non-elastomeric polymer blocks which, as homopolymers have glass transition temperatures above 50° C., while the center elastomeric polymer blocks are derived from at least one conjugated diene such as butadiene or isoprene. These mid-blocks may, if desired, be partially or substantially hydrogenated. Further, they may be linear or branched. Typical branched structures contain a mid-block portion with at least three branches which can radiate out from a central hub or can be otherwise coupled together.

While the specific molecular weight of the block copolymer prepared from the conjugated diene and the non-elastomeric terminal blocks may be varied for specific end uses, it is preferred that the elastomeric center blocks have an average molecular weight from about 15,000 to about 250,000, preferably 24,000 to 150,000, and that they comprise from 50 to 90% by weight of the entire block copolymer. The terminal blocks which comprise the remaining 10 to 50% of the copolymer are those having average molecular weights between 5,000 and 125,000, preferably 5,000 to 25,000. The molecular weights mentioned herein are number average molecular weight. These terminal blocks are prepared by polymerization of vinyl aromatic monomers and should have glass transition temperature above about 50° C., and the difference in glass transition temperature between that of the center block and of the end blocks should be greater than about 100° C.

The non-elastomeric terminal blocks preferably comprise homopolymers or copolymers of mono vinyl aromatic monomers such as styrene, vinyl toluene, vinyl xylene, ethyl vinyl benzene as well as bicyclic monovinyl compounds such as vinyl naphthalene and the like.

The center elastomeric blocks are prepared from conjugated dienes such as isoprene, butadiene, copolymers of styrene and butadiene as well as their homologues. Additionally, these elastomeric blocks may be hydrogenated as taught, for example, in U.S. Pat. No. 3,700,633.

The non-functionalized block copolymers may be prepared using methods taught, for example, in U.S. Pat. Nos. 3,239,478; 3,427,269; 3,700,633; 3,753,936 and 3,932,327 or they may be obtained from manufacturers such as Shell Chemical Company or Dow Chemical as well as Fina Ltd. in the Netherlands.

The tackifying resins which are preferably used in the adhesive compositions must be compatible with the polymers and are generally polar in nature and have a Ring and Ball softening point greater than 60° C. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, maleated rosin and polymerized rosin; (2) terpene resins, (3) phenolic modified terpene resins and hydrogenated derivatives thereof such, for example, as the resin product resulting from the condensation, in an acidic medium of a bicyclic terpene and a phenol and (4) C5, C5/C9, C9 and C10 aliphatic or aromatic tackifying resins. Mixtures of two or more of the above described tackifying resins, as well as blends of the above resins with small amounts of (e.g., less than about 10% of the adhesive) less compatible resins may be utilized for some formulations. For these water sensitive adhesives, the use of rosin based tackifiers such as Foral NC, a hydrogenated rosin available from Hercules Incorporated, is particularly preferred. If present, the tackifier may comprise up to about 70% of the adhesive; however, it is generally used in amounts of about 20 to 60% by weight. The water sensitive plasticizers used herein comprise 10 to 50% of the adhesive. The plasticizers are of the general class of non-ionic surfactants where the hydrophilic portion of the molecule consists of a polyalkylene oxide such as polyethylene oxide, polypropylene oxide, or polyethylene oxide/propylene oxide copolymers. The hydrophobic portion of the molecule is a hydrocarbon radical such as phenyl, phenyl alkyl, phenyl dialkyl, or a linear or branched aliphatic radical. They are also characterized by HLB values (hydrophilic/lipophilic balance) in the range of 8 to 18. Those with higher HLB values exhibit higher water sensitivity. Surfactants useful in the current invention exhibit HLB values in the range 8 to 18 and preferably 9.5 to 15. Most preferable are plasticizers with HLB values from 10 to 14. Preferred compatible plasticizers include alcohol ethoxylates. Particularly preferred are the 5 mole ethoxylate of phenol available from ICI as Pycal 94 (HLB=14); the 8 mole ethoxylate of dodecanol available from Huntsman as Surfonic L12-8 (HLB=13.6); the 10 mole ethoxylate of dinonyl phenol available from Huntsman as DNP-100 (HLB=11.2) and the phenyl ether of polyethylene-glycol with the ethoxylate of dinonyl phenol available from PPG as Macol DNP 10.

Some applications conventionally employing adhesives may require the use of wax diluents in order to reduce the melt viscosity or cohesive characteristics of the hot melt adhesive compositions without appreciably decreasing their adhesive bonding characteristics. These waxes are often used in adhesives which do not exhibit pressure sensitive properties.

Suitable waxes include N-(2-hydroxyethyl) 2,2'-ethylene bis-stearamide, stearamide, 12-hydroxystearamide wax, hydrogenated castor oil, oxidized synthetic waxes, poly(ethylene oxide) having a molar average molecular weight above about 1000 and functionalized synthetic waxes such as carbonyl containing Escomer H101 from Exxon.

Among the applicable stabilizers or antioxidants which may be included herein are high molecular weight hindered phenols and multifunctional phenols such as sulfur and phosphorous-containing phenols. Representative hindered phenols include: 1,3,5-trimethyl-2,4,6-tris(3,5-di-tert-butyl-4-hydroxyphenyl) propionate; n-octadecyl 3,5-di-tert-butyl-4-hydroxyphenyl) propionate; 4,4'-methylenebis (2,6-di-tert-butylphenol); 4,4'-thiobis (6-tert-butyl-o-cresol); 2,6-di-tert-butylphenol; 6-(4 -hydroxyphenoxy)-2,4-bis(n-octylthio)-1,3,5-triazine; di-n-octadecyl-3,5-di-tert-butyl-4-hydroxybenzylphosphonate; 2-(n-octylthio)-ethyl 3,5-di-tert-butyl-4-hydroxybenzoate; and sorbitol hexa[3-(3,5 -di-tert-butyl-4-hydroxyphenyl)propionate]. If used, the stabilizer is present in levels of about 0.1 to 3% by weight.

Optional additives may be incorporated into the hot melt compositions in order to modify certain properties thereof. Among these additives may be included colorants such as titanium dioxide; and fillers such as talc, etc; wetness indicators such as Basacid Blue moisture sensitive indicators or Bromophenol Blue pH sensitive indicators. There may also be present in the adhesive small amounts (e.g., less than about 30% by weight, and preferably 5 to 20% by weight) of certain thermoplastic polymers such as ethylene vinyl acetate copolymers containing about 12 to 50% vinyl acetate, ethylene acrylic acid, ethylene methyl acrylate and ethylene n-butyl acrylate copolymers as well as caprolactone polymers and poly(hydroxy-butyrate/hydroxyvalerate). These polymers are employed in order to impart flexibility, toughness and strength. Alternatively, and in particular, it may be desirable to incorporate into the hot melt adhesive up to 20% by weight of certain hydrophilic polymers such as polyvinyl alcohol, hydroxyethyl cellulose, hydroxy-propylcellulose, polyvinyl methyl ether, poly(ethylene oxide), or modified or derivatized starch which will function to increase the water sensitivity of the adhesives which may be desired for some applications.

An exemplary procedure involves placing approximately 20% of the total plasticizer with all of the polymer and stabilizer(s) in a jacketed mixer, preferably in a jacketed heavy duty mixer, which is equipped with rotors or sigma blades and thereupon raising the temperature of the mixer and contents to a range from 100° C. to about 190° C. After the polymer has masticated sufficiently to become smooth, a homogeneous mass is obtained whereupon mixing and heating are continued and the tackifying resin(s) is slowly added and uniformly admixed therewith. Last, the remainder of the plasticizer is added and thoroughly mixed in.

As noted above, the resulting adhesives may be employed in a wide variety of uses as are known in the art. The adhesives may be effectively utilized in a variety of packaging and carton sealing applications. The non-pressure sensitive adhesives may also be used to bind a plurality of sheets in a wide range of bookbinding operations. They may also be used for laminating tissue and/or screen-reinforced tissue layers such as are used in individual or roll use applications as in wipes, paper towels, toilet tissue and other consumer or industrial end uses. The adhesives of this invention are especially useful in the assembly or construction of various disposable articles including, but not limited to, sanitary napkins, disposable diapers, hospital gowns, bed pads and the like. In particular, adhesives are useful for the assembly of disposable articles using multi-line, spray, or slot-coating construction techniques wherein at least one flexible film substrate is bonded to at least one tissue, non-woven, polyolefin or other flexible polymeric film substrate. In addition, the adhesives may be useful in the bonding of elastic to polyethylene, polypropylene or non-woven substrate so as, for example, to impart elongation resistant gathers thereto as well as for positioning adhesives for sanitary napkins. The adhesive may also be utilized in less demanding disposable construction applications such as for end or perimeter sealing. Also, this adhesive has utility as a bandage adhesive which can be easily removed by applying water thereby preventing trauma to skin.

In the following illustrative examples all parts are given by weight and all temperatures in degrees Celsius unless otherwise noted.

TESTING PROCEDURES

Viscosity: Measurements were determined after 30 minutes using a Brookfield viscometer (Spindle 27) of 250° F., 275° F. or 300° F.

Contact Angle: A ½ mil film of the hot melt to be tested is made on a 3"×1"×1 mm microscope slide. The Rame-Hart Goniometer (Model 100-06), outfitted with a Polaroid camera attachment (Model 100-14) and a Micro-syringe attachment (Model 100-10) is used to measure contact angle. A micro-syringe is filled with deionized water, and a drop of water is placed on top of the hot melt. The normal filming sequence is as follows:

1. Cock the shutter
2. Watch the drop fall
3. Press the shutter release mechanism on the cable.

Measure the angle made by the bottom of the drop to the side of the drop of water on the Polaroid picture.

The lower the contact angle, the more hydrophilic, i.e., water sensitive, is the adhesive. This property is particularly important in flushable applications and for bonding superabsorbent polymers.

Loop Tack From Polyethylene Film-Loss of Tack: The test is used to determine the relative quick stick/tackiness and the immediate loss of tack after immersion in water.

1. A 2–3 mil coating of adhesive to mylar, using rollers heated to approximately 300° F.
2. Adhesive application temperature should be 300° to 350° F.
3. Cut five 1"×5" strips in the machine direction from the coated mylar. Condition 24 hours at constant temperature and humidity.
4. Fold bonds into a loop by taking the 1" ends and taping them together with 1" masking tape.
5. Fasten polyethylene to the stainless steel plate using double sided tape.
6. Place the loop into the machine's jaws and test.
7. Using a new 1"×5" strip quickly immerse the strip in water at room temperature and immediately test as described above.

Thermal Stability:. The purpose of this test is to check the compatibility of the formulation's raw materials, the pot life and to make sure the formulation will not clog an applicator nozzle.

1. First determine the initial viscosity of the hot melt sample.
2. Place 100 g of sample in a clean 8 oz. short jar (if one does not have enough sample run the test with 30 g in a 4 oz. short jar). Cover with aluminum foil and place in an air circulating oven at the desired testing temperature, typically 250° to 350° F.
3. After the testing period, remove the jar, check for the following:
   a. Skin
   b. Dirt/char particles
   c. Sedimentation—partial skin precipitating and falling to the bottom of the jar.
   d. Volatile char
   e. Gelation—carefully examine the contents with a glass stirring rod for signs of gels or lumps.
   f. Color or odor
   g. Product separation—the presence of distinct layers, also known as phasing.
4. Determine the final viscosity of the hot melt sample. A final viscosity is not done for products which have skinned or separated.

EXAMPLE I

Various adhesive samples were prepared by placing approximately 20% of the total plasticizer together with all of the polymer and stabilizer(s) in a jacketed heavy duty mixer equipped with rotors or sigma blades and thereupon raising the temperature of the mixer and contents to 100° to 190° C. After the polymer has masticated sufficiently to become smooth, a homogeneous mass is obtained whereupon mixing and heating are continued and the tackifying resin (s) is slowly added and uniformly admixed therewith. The remainder of the plasticizer is then added and thoroughly mixed in.

A Control formulation was prepared from 15.59 parts Kraton G 1650 (a styreneethylene/butylene styrene block copolymer available from Shell), 58.66 parts Res H100 (a $C_5$ hydrocarbon resin available from Eastman), 24.75 parts mineral oil, 0.5 parts Irganox 1010 and 0.5 parts titanium dioxide.

Table I shows the use of various plasticizers in the preparation of adhesive samples.

TABLE I

|  | A | B | C | D | E | Control |
|---|---|---|---|---|---|---|
| Vector 4411, | 28 | 28 | 24 | 35 | 40 | — |
| Foral NC | 56 | 56 | 60 | 49 | 47 | — |
| Pycal 94 | — | — | 16 | — | — | — |
| Macol DNP 10 | — | 16 | — | 16 | — | — |
| Macol 206 E | 16 | — | — | — | — | — |
| Texaco L12-8 | — | — | — | — | 16 | — |
| Irganox 1010 | 0.5 | 0.5 | 0.5 | 0.5 | 0.5 | — |
| Irganox 168 | — | — | — | 0.5 | 0.5 | — |
| Viscosity (cps) | | | | | | |
| @ 275° F. | — | 4650 | 1462 | 9062 | 14,225 | — |
| @ 300° F. | — | 2210 | 895 | 4150 | 6,450 | 2,250 |
| Cotton Peel g/lin. inch | — | 554 | — | 125 | 50 | 95 |
| Transfer-Cotton | | | | | | |
| g/lin. inch | — | 2117 | — | 1100 | — | 720 |
| % transfer | — | moderate transfer | — | 0% | 100% | — |
| Heat Stability: 24 hours @ 275° F., 100 g | | | | | | |
| Color | — | Yellow | Yellow | Yellow | Yellow | — |
| Skin/Gel | — | None | None | None | None | — |
| Separation | — | None | None | None | None | — |
| Edge ring | — | None | None | None | None | — |
| Viscosity @ 275° F. | — | 3675 | 1070 | 3675 | 14,100 | — |
| Contact Angle | — | 68° | 68° | 67° | — | 82° |
| Loop Tack-Poly (oz/in²) | | | | | | |
| Initial, dry | — | 50 | 26 | — | — | 85 |
| Wet | — | 0 | 0 | — | — | 49 |

Sample A shows that a non-pressure sensitive adhesive can be made using an ethoxylated bis-phenol A, Macol 206E available from PPG Industries. Next, Samples B, C, D, and E illustrate pressure sensitive formulations for use in construction and positioning adhesives. Samples B and D use an ethoxylated dinonyl phenol, DNP-10 available from PPG Industries. Sample C uses an ethoxylated phenol, Pycal 94 available from ICI and Sample D a linear alcohol ethoxylate, L12-8 available from Huntsman Corporation. The above formulations use a styrene-isoprene-styrene polymer with approximately 40% styrene end block (Vector 4411 available from Dexco) and Foral NC (a hydrogenated rosin available from Hercules Incorporated). The antioxidant package used hindered phenol, Irganox 1010 and a phosphite, Irgafos 168, both available from Ciba Additives.

All the Samples will lose tack upon exposure to water. This is also evident from the results of the contact angle which, for the samples tested are in the 67° to 68° range as compared to 82° for the control. Contact angle gives an indication of how well water will wet out on the surface. The lower the contact angle, the more hydrophilic the surface. Further testing results indicate that the cotton peel of Sample D was comparable to the control, also, D will not transfer in a transfer peel test from cotton. The loop tack test value for the plasticizer/rubber formulation, Sample B, is 50 oz/in$^2$ dry and 0 oz/in wet. While the control has loop tack values of 85 oz/in$^2$, and 49 oz/in$^2$ dry and wet respectively. Dry loop tack values give an indication of how pressure sensitive an adhesive is. Wet loop tack values show how water sensitive or hydrophilic a hot melt pressure sensitive adhesive is.

EXAMPLE II

Example II illustrates the compatibility of various tackifying resins in the water sensitive hot melt adhesives of the invention. Sample F shows the compatibility of a terpene phenolic, Arizona XR7022 from Arizona Chemical, which yields a non-pressure sensitive adhesive. Samples G, H and I show the utility of a partially hydrogenated gum rosin, Staybelite (Hercules), a pentaerythritol ester, Unitac R-100L (Union Camp) and a polyol rosin ester, Unitac R-86 (Union Camp), respectively, in a pressure sensitive adhesive for use in construction and positioning adhesives.

TABLE II

|  | F | G | H | I |
|---|---|---|---|---|
| Vector 4411 | 28 | 35 | 35 | 35 |
| XR 7022 | 52 | — | — | — |
| Staybelite | — | 49 | — | — |
| Unitac R-100L | — | — | 49 | — |
| Unitac R-86 | — | — | — | 49 |
| Pycal 94 | 20 | — | — | — |
| Macol DNP-10 | — | 16 | 16 | 16 |
| Irganox 1010 | 0.5 | 0.5 | 0.5 | 0.5 |
| Irgafox 168 | 0.5 | 0.5 | 0.5 | 0.5 |
| Contact Angle | 75° | — | — | — |
| Viscosity (cps) |  |  |  |  |
| @ 275° F. | — | 4262 | 13,800 | 10,250 |
| @ 300° F. | — | 2285 | 6,825 | 5,100 |
| Cotton Peel | — | 500 g/ Lin. In. | 875 g/ Lin. In. | 625 g/ Lin. In. |
| Transfer Peel Cotton % Transfer | Not Tested | 100% | — | 100% |
| Heat Stability: 24 hours @ 275° F., 100 g covered |  |  |  |  |
| Color | Not Tested | Amber | Amber | Amber |
| Skin |  | None | None | None |
| Gel |  | None | None | None |
| Separation |  | None | None | None |
| Edge Ring |  | None | None | None |

EXAMPLE III

Example III illustrates the use of Vector 4111, a low end styrene isoprene styrene block rubber, containing approximately 18% end block (Dexco). In the Table, Sample J shows how a non-pressure sensitive adhesive can be made using Macol 206 and a terpene phenolic Nirez 300 (Arizona). Sample K shows how a pressure sensitive adhesive can be made using Foral NC, hydrogenated methyl ester of rosin—Hercolyn D (Hercules) and Pycal 94, for use in a water releasable pressure sensitive adhesive in medical adhesives, depilatory pads and disposables markets. A water releasable medical adhesive will give high level strength to skin along with ease of removal from skin when it contacts water. To a patient undergoing radiation treatment or receiving steroidal drugs there is the potential of tearing skin when conventional pressure sensitive adhesives are removed.

TABLE III

|  | J | K |
|---|---|---|
| Vector 4111 | 28 | 28.2 |
| Nirez 300 | 56 | — |
| Foral NC | — | 54.6 |
| Hercolyn D | — | 5.1 |
| Macol 206E | 16 | — |
| Pycal 94 | — | 12.1 |
| Irganox 1016 | 0.5 | 0.5 |
| Irgafos 168 | 0.5 | 0.5 |
| Viscosity @ 325° F. | Not Tested | 815 cps |
| Loop Tack |  |  |
| Dry | Not Tested | 81 oz/in$^2$ |
| Wet |  | 0 oz/in$^2$ |
| Contact Angle | Not Tested | 65° |
| Heat Stability: 72 hours @ 350° F., 100 g, Covered |  |  |
| Color |  | Brown |
| Skin |  | None |
| Gel |  | None |
| Separation |  | None |
| Edge Ring |  | Light |

A 1 mil coating of Sample J on perforated polyethylene was bonded to skin at room temperature. The force required to remove the strip was measured using a Hunter force gauge. A new coated strip of polyethylene was bonded to skin at room temperature, immersed in room temperature water and quickly removed. The force required to remove the strip after contact with water was measured in a similar way with a Hunter force gauge. The results were compared with those obtained using, as a Control, a commercial tackified block copolymer adhesive in which the plasticizer is mineral oil.

|  | J | Control |
|---|---|---|
| Dry (lb/Lin. Inch) | 0.5 | 1.4 |
| Wet (lb/Lin. Inch) | 0.1 | 1.4 |

We claim:

1. A water sensitive hot melt adhesive composition consisting essentially of 5 to 80% by weight of a A-B-A linear or radial rubbery block; 10 to 50% by weight of a water soluble or water dispersible plasticizer containing a hydrophilic portion consisting of a polyalkylene oxide and a hydrophobic portion consisting of a hydrocarbon radical selected from the group consisting of phenyl, phenyl alkyl, phenyl dialkyl or a linear or branched aliphatic radical and having an HLB value within the range of 8 and 18; 0 to 85% by weight of a compatible tackifying resin; 0 to 30% by weight of a compatible thermoplastic polymer selected from the group consisting of ethylene vinyl acetate copolymers containing 12 to 50% vinyl acetate, ethylene acrylic acid, ethylene methyl acrylate, ethylene n-butyl acrylate, caprolactone polymers and poly(hydroxy-butyrate/hydroxyvalerate); 0 to 35% by weight polar wax; and 0 to 3% by weight stabilizer.

2. The water sensitive hot melt adhesive of claim 1 wherein the plasticizer has an HLB within the range of 10 to 14.

3. The water sensitive hot melt adhesive of claim 1 wherein the plasticizer is an alcohol ethoxylate.

4. The water sensitive hot melt adhesive of claim 1 wherein the plasticizer is selected from the group consisting of the 5 mole ethoxylate of phenol, the 8 mole ethoxylate of dodecanol, the 10 mole ethoxylate of dinonyl phenol and the phenyl ether of polyethylene-glycol with the ethoxylate of dinonyl phenol.

5. The water sensitive hot melt adhesive of claim 1 wherein the tackifying resin is polar in nature and has a Ring and Ball softening point greater than 60° C. and is selected from the group consisting of natural and modified rosins, terpene resins, phenolic modified terpene resins and C5, C5/C9, C9 or C10 aliphatic or aromatic tackifying resins.

6. The water sensitive hot melt adhesive of claim 5 wherein the tackifying resin is a hydrogenated rosin.

7. The water sensitive hot melt adhesive of claim 1 wherein the tackifying resin is present in an amount of 20 to 60% by weight of the adhesive.

8. The water sensitive hot melt adhesive of claim 1 additionally containing up to 30% by weight of a compatible thermoplastic polymer selected from the group consisting of ethylene vinyl acetate copolymers containing 12 to 50% vinyl acetate, ethylene acrylic acid, ethylene methyl acrylate, ethylene n-butyl acrylate, caprolactone polymers and poly(hydroxy-butyrate/hydroxyvalerate).

* * * * *